United States Patent
Yang (10) Patent No.: US 8,400,420 B2
(45) Date of Patent: Mar. 19, 2013

(54) IMAGE DISPLAY SYSTEM AND METHOD FOR CONTROLLING A TOUCH PANEL THEREOF

(75) Inventor: Kai-Chieh Yang, Niaosong Township, Kaohsiung County (TW)

(73) Assignee: Chimei Innolux Corporation (TW)

( * ) Notice: Subject to any disclaimer, the term of this patent is extended or adjusted under 35 U.S.C. 154(b) by 351 days.

(21) Appl. No.: 12/768,839

(22) Filed: Apr. 28, 2010

(65) Prior Publication Data
US 2010/0309161 A1 Dec. 9, 2010

(30) Foreign Application Priority Data
Apr. 30, 2009 (TW) .............................. 98114388 A (51) Int. Cl.
*G06F 3/045* (2006.01)

(52) U.S. Cl. ..................................... 345/174; 178/18.06

(58) Field of Classification Search .................. 345/173, 345/174; 178/18.03, 18.06
See application file for complete search history.

(56) References Cited

U.S. PATENT DOCUMENTS

| | | | | |
|---|---|---|---|---|
| 4,306,110 | A * | 12/1981 | Nelson et al. .............. | 178/18.05 |
| 2008/0142281 | A1* | 6/2008 | Geaghan ................... | 178/18.06 |
| 2009/0231302 | A1 | 9/2009 | Hsueh et al. | |
| 2010/0073325 | A1 | 3/2010 | Yang | |

* cited by examiner

*Primary Examiner* — Kevin M Nguyen
(74) *Attorney, Agent, or Firm* — Lowe Hauptman Ham & Berner, LLP (57) ABSTRACT

The present invention provides an image display system including a display device. The display device further includes a capacitive touch panel and a power supply. In operation, the display device has a common electrode. The touch panel includes a sensing capacitor module and a sampling capacitor. The sensing capacitor module is connected to the common electrode, and has a variable capacitance. The sampling capacitor is selectively electrically connected to the sensing capacitor and the common electrode.

20 Claims, 6 Drawing Sheets

IMAGE DISPLAY SYSTEM AND METHOD FOR CONTROLLING A TOUCH PANEL THEREOF

CROSS-REFERENCE TO RELATED APPLICATIONS

This application claims the right of priority based on Taiwanese Patent Application 098114388 entitled "IMAGE DISPLAY SYSTEM AND METHOD FOR CONTROLLING A TOUCH PANEL THEREOF", filed on Apr. 30, 2009 which is incorporated herein by reference and assigned to the assignee herein.

FIELD OF INVENTION

The present invention relates to an image display system, particularly to an image display system having a display device with a touch panel integrated thereon.

BACKGROUND OF THE INVENTION

Conventionally a capacitive touch panel is seldom incorporated into a monitor or a display device, particularly a flat display device such as an LCD display because the capacitive touch panel cannot provide high resolution. For example, the capacitive touch panel may be unable to respond to an object causing a too small contact area, such as a stylus tip.

Moreover, when a capacitive touch panel is disposed on a flat display device, parasitic capacitors and noises between the panel and the display device will cause some problems. Also due to the frequency limitation, line-by-line scanning may not be used here.

SUMMARY OF THE INVENTION

One aspect of the present invention is to provide an image display system, which has a capacitive touch panel incorporated into a display device. Another aspect is to solve the problems caused by parasitic capacitors and noises between the panel and the display device of the image display system.

In one embodiment, disclosed is an image display system including a display device. The display device includes a capacitive touch panel and a power supply. The display device has a common electrode. The touch panel includes a sensing capacitor module and a sampling capacitor. The sensing capacitor module is coupled to the common electrode, and the capacitance of the sensing capacitor module is variable. The sampling capacitor is selectively electrically connected to the sensing capacitor module and the common electrode.

In another embodiment, a method for the image system above includes: charging said sensing capacitor module; discharging the sensing capacitor module; and in response to the sensing capacitor module being discharged, electrically connecting the sampling capacitor to the sensing capacitor module and the common electrode.

In another embodiment, an image display system includes a display device. The display device includes a capacitive touch panel and a power supply. The display device has a common electrode. The touch panel includes a capacitor group and a sampling capacitor. The capacitor group includes a first sensing capacitor module and a second sensing capacitor module. The first sensing capacitor module and the second sensing capacitor module are respectively coupled to the common electrode, and capacitances of the first sensing capacitor module and the second sensing capacitor module are variable. The sampling capacitor is selectively electrically connected to the capacitor group and the common electrode.

The above and others objects, features and advantages of the present invention will become more apparent from the following detailed description in conjunction with the accompanying drawings.

BRIEF DESCRIPTION OF THE DRAWINGS

The invention will now be further described by way of example only with reference to the accompany drawings in which.

DETAILED DESCRIPTION OF THE PREFERRED EMBODIMENTS

The following embodiments of the present invention provide an image display system having a display device with a touch panel integrated thereon. The invention will now be further described by way of example with reference to the accompany FIG. 1 to FIG. 2e.

Figure 1:
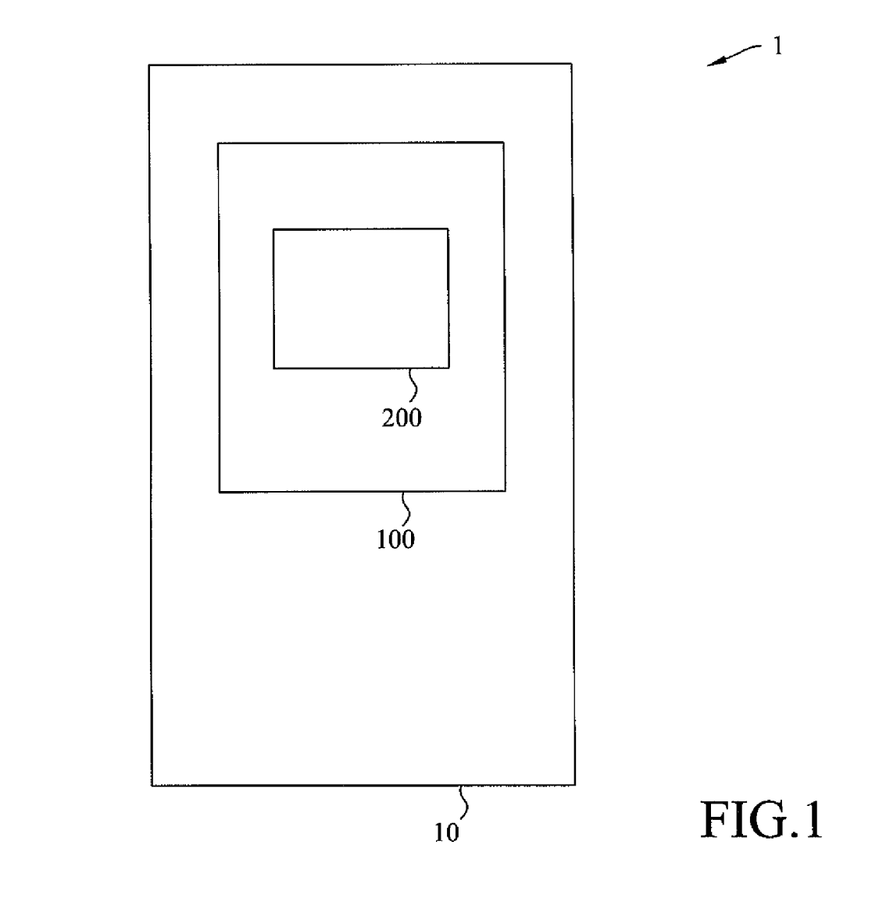
FIG. 1 shows an image display system according to an embodiment of the present invention.

As shown in FIG. 1, the image display system 1 includes an electronic device 10 with a display device 100 (such as a liquid crystal display (LCD) or organic light emitting display (OLED) display device). Particularly, a capacitive touch panel 200 is incorporated into the display device 100. The display device 100 further includes a power supply (not shown) for the operation of the touch panel 200. A user can view the images of the display device 100 through the capacitive touch panel 200.

In an embodiment, the electronic device 10 incorporating the display device 100 could be a TV, a mobile phone, a digital camera, a personal digital assistant (PDA), a notebook computer, a desktop computer, a television, a global positioning system (GPS), a car media player, an avionics display, a digital photo frame, or a portable video player.

Figure 2A:
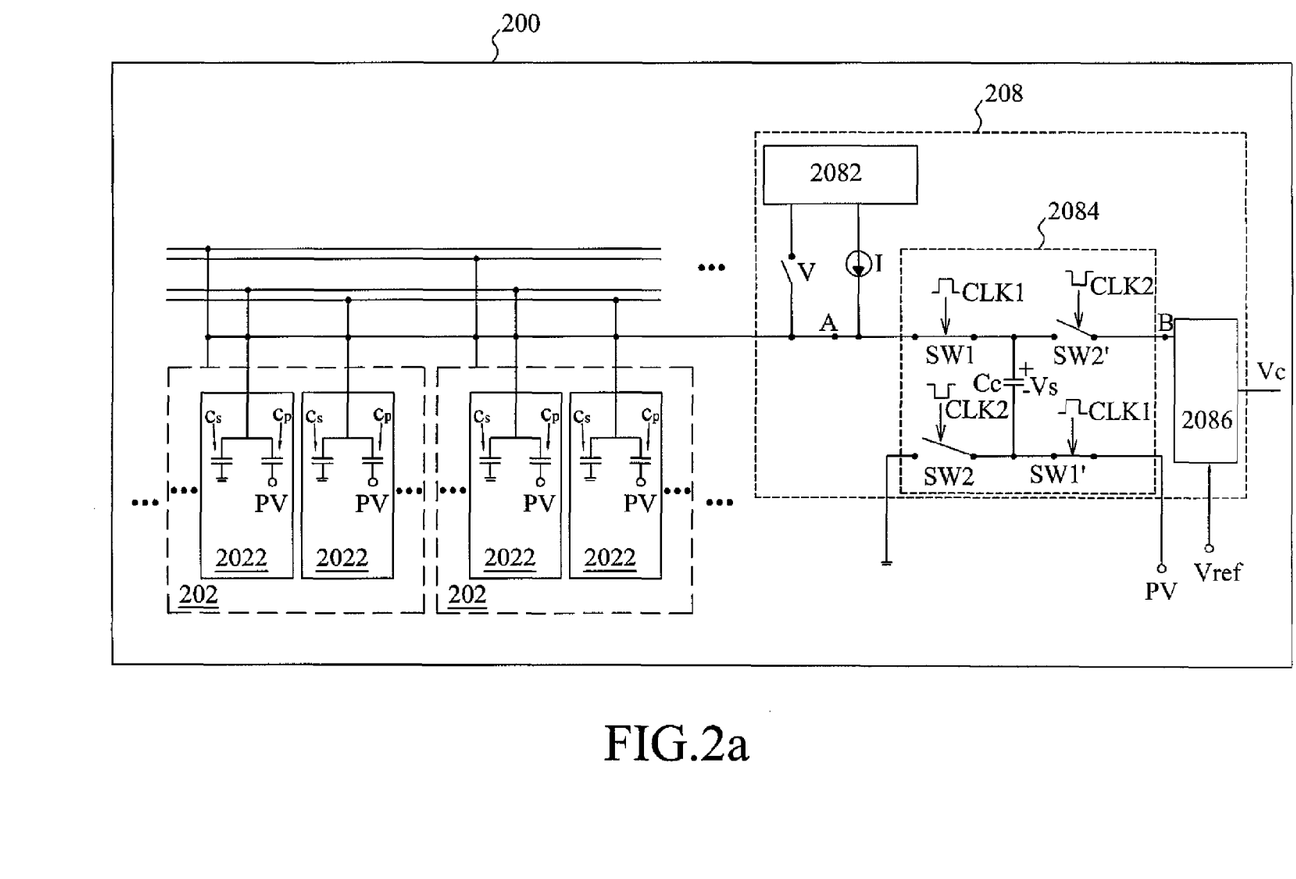
FIG. 2a shows the circuit of a capacitive touch panel according to an embodiment of the present invention.

FIG. 2a shows the circuits of the capacitive touch panel 200 according to an embodiment of the present invention. The touch panel 200 includes a plurality of capacitor groups 202 and a processing circuit 208. Each capacitor group 202 further includes a plurality of capacitor modules 2022, and each capacitor module may have a variable sensing capacitor Cs. An electrode of the variable sensing capacitor Cs could be embodied as a transparent electrode using Indium Tin Oxide (ITO) as material. When a capacitor module 2022 is touched by user's finger or a stylus tip, the capacitance of the capacitor module 2022 will change. This part should be well-known to those skilled in the art and thus the details are omitted hereinafter.

Figure 2B:
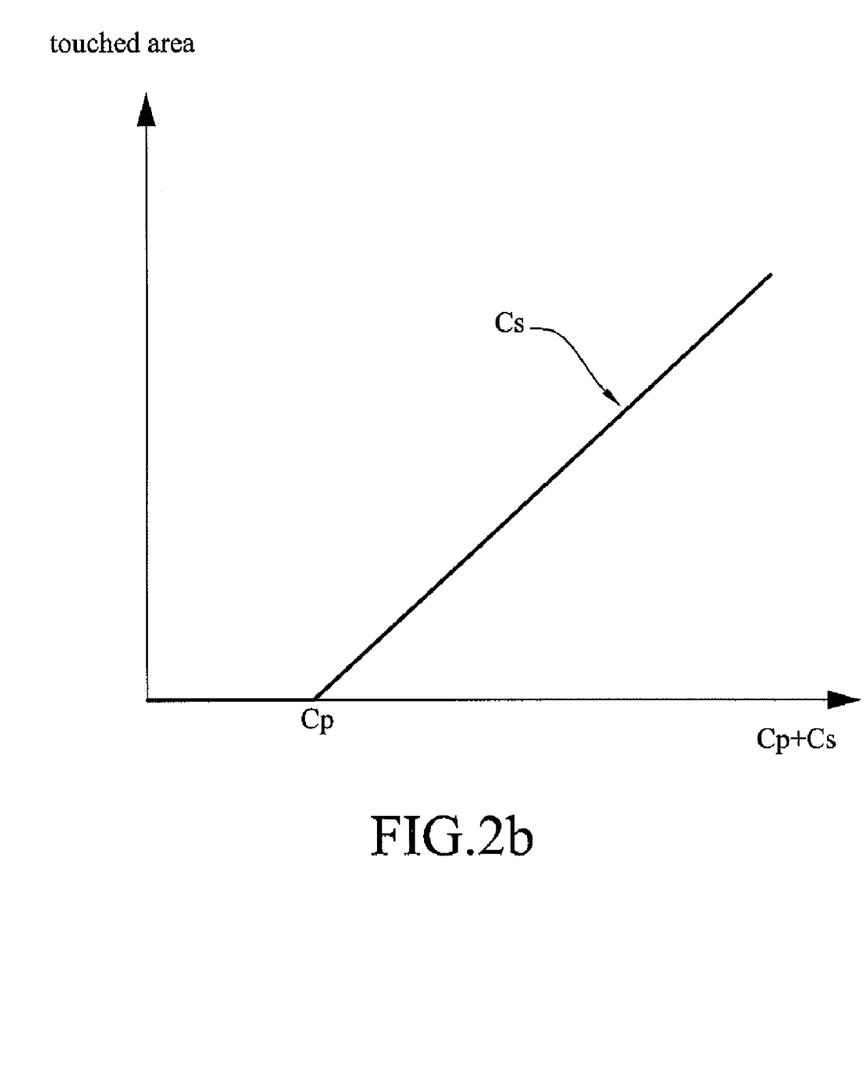
FIG. 2b illustrates the relation between capacitance and the touched area.

Note that a parasitic capacitor Cp may exist between an electrode of the capacitor module 2022 and the common electrode PV of the display device 100 or between electrodes of neighboring capacitor modules 2022. The parasitic capacitor Cp is formed when the touch panel 200 is assembled to the display device 100, and the capacitance of parasitic capacitor Cp is substantially fixed. FIG. 2b further illustrates the relation between the touched area of a capacitor modules 2022 and the resulting capacitance, wherein X-axis represents the capacitance, and Y-axis represents the touched area of the capacitor modules 2022. As shown, when the touched area increases, the capacitance of sensing capacitor Cs accordingly increases to store more electricity.

The processing circuit 208 includes a charge/discharge circuit 2082, a noise suppressing circuit 2084, and a comparison circuit 2086. Depending on the operations of the scanning circuits (not shown) of the touch panel 200, the charge/discharge circuit 2082 can charge/discharge a single capacitor module 2022 or multiple capacitor modules 2022, in turn or at the same time. Note that the parasitic capacitor Cp mentioned before will have some effects together with the sensing capacitor Cs. But as shown in FIG. 2b, when the capacitance of the sensing capacitor Cs may change in response to user's touching operation, the capacitance of parasitic capacitor Cp is around fixed.

The charge/discharge circuit 2082 provides a fixed charging voltage V to charge the capacitor modules 2022, and provides a fixed current to a single capacitor module 2022 or multiple capacitor modules 2022 for discharging it/them in turn or at the same time. When the processing circuit 208 is conductive to the capacitor module(s) 2022, an equivalent voltage of the capacitor modules 2022 could be measured at the node A. Accordingly, when the capacitor module(s) 2022 are touched by the object TOB, the capacitance variance of capacitor modules 2022 will affect the equivalent voltage VA at the node A.

The noise suppressing circuit 2084 includes a sampling capacitor Cc. When a capacitor module 2022 is discharged by being conductive to the charge/discharge circuit 2082, the sampling capacitor Cc will be used to store the electricity flowed out from the capacitor modules 2022, so as to measure the capacitance or capacitance variance of the capacitor modules 2022. In other embodiments, when several capacitor modules 2022 of a capacitor group 202 are discharged in turn or at the same time by being conductive to the charge/discharge circuit 2082, the sampling capacitor Cc will be used to store the electricity flowed out from one or more capacitor modules 2022, so as to measure the capacitance or capacitance variance of one or more capacitor modules 2022.

As mentioned above, a capacitor module 2022 unavoidably has a parasitic capacitor Cp with respect to the common electrode PV of the display device 100. When the common electrode PV brings in some noises, the electricity stored either in the capacitor modules 2022 or in the sampling capacitor Cc will be affected by the noises, so the capacitance of the capacitor modules 2022 cannot be measured accurately. Therefore in this embodiment, one node of the sampling capacitor Cc is coupled to one or more capacitor modules 2022, and the other node is coupled to the common electrode PV of the display device 100. As shown, both nodes of the sampling capacitor Cc will be affected by the noises brought by the common electrode PV but will be offset by each other. Therefore even the common electrode PV will bring noises, the sampling capacitor Cc is still able to measure the electricity flowed out from the capacitor modules 2022 accurately.

Figure 2C:
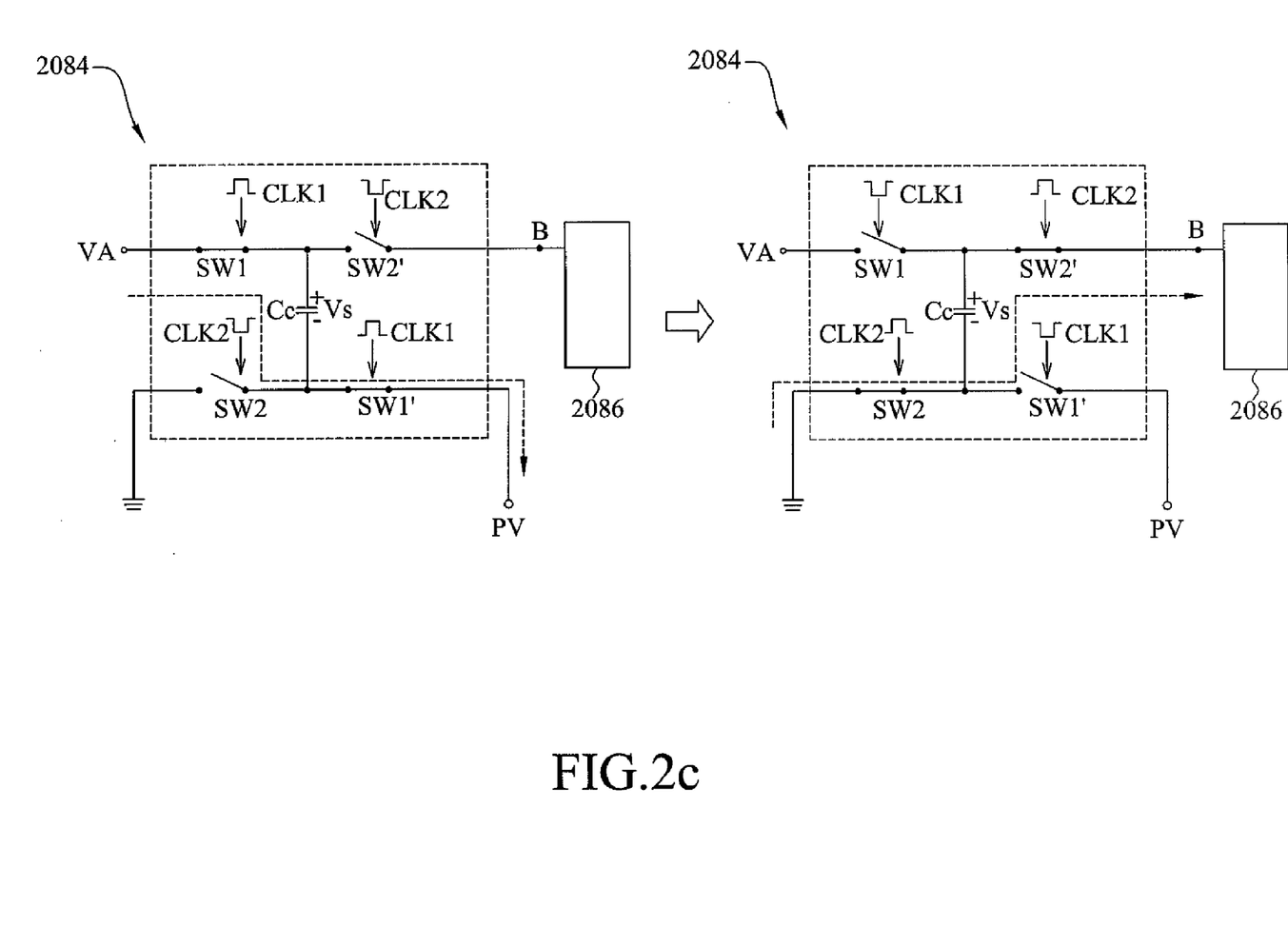
FIG. 2c shows the noise suppressing circuit according to an embodiment of the present invention.

FIG. 2c illustrates the noise suppressing circuit 2084 according to an embodiment of the present invention. The noise suppressing circuit 2084 includes a sampling capacitor Cc, a first set of switches SW1 and SW1', and a second set of switches SW2 and SW2'. The first set of switches SW1 and SW1' are operated synchronizedly. The switch SW1 is disposed between the sampling capacitor Cc and the capacitor module 2022, and the switch SW1' is disposed between the sampling capacitor Cc and the common electrode PV. The second set of switches SW2 and SW2' are operated synchronizedly too. The switch SW2 is disposed between the sampling capacitor Cc and the ground, and the switch SW2' is disposed between the sampling capacitor Cc and the comparison circuit 2086. In addition, the first set of switches SW1 and SW1' are operated inversely to the second set of switched SW2 and SW2'.

The first set of switches SW1 and SW1' are ON or OFF in response to the first timing signal CLK1 from the display device 100, and the second set of switches SW2 and SW2' are ON or OFF in response to the second timing signal CLK2 from the display device 100. In this embodiment, the first set of switches SW1 and SW1' and the second set of switches SW2 and SW2' could be embodied as the same n-type transistors (or p-type transistors), and the first timing signal CLK1 could be inverse to the second timing signal CLK2. But if the first set of switches SW1 and SW1' are embodied as n-type transistors and the second set of switches SW2 and SW2' are embodied as the same p-type transistors, then the first timing signal CLK1 and the second timing signal CLK2 could be in-phase.

In the following the operation of the noise suppressing circuit 2084 is explained. In the embodiment shown in FIG. 2c, the first set of switches SW1 and SW1' and the second set of switches SW2 and SW2' are all n-type transistors, the first timing signal CLK1 is inverse to the second timing signal CLK2. In the beginning, on the first stage, the first set of switches SW1 and SW1' are ON and the second set of switches SW2 and SW2' are OFF as shown in the left of FIG. 2c. At this time, the sampling capacitor Cc is electrically connected to the capacitor module 2022 and the common electrode PV for receiving electricity flowed out from the capacitor module 2022. Because one node of the sampling capacitor Cc is coupled to the common electrode PV, the noises brought by the common electrode PV will be offset at the both node of the sampling capacitor Cc even when the equivalent voltage VA at the node A may be affected. Thus the electricity received by the sampling capacitor Cc will not be affected, and the voltage Vs formed at the sampling capacitor Cc can correctly reflect the capacitance of the capacitor module 2022.

On the next stage, as shown in the right of FIG. 2c, the first set of switches SW1 and SW1' are OFF and the second set of switches SW2 and SW2' are ON. At this time, the sampling capacitor Cc is electrically connected to the comparison circuit 2086 and the ground. The voltage Vs of the sampling capacitor Cc, which is stored on the previous stage, will be received by the comparison circuit 2086 at node B and then compared with a reference voltage Vref to generate an output signal Vc. More details will be provided later together with FIG. 2d.

Figure 2D:
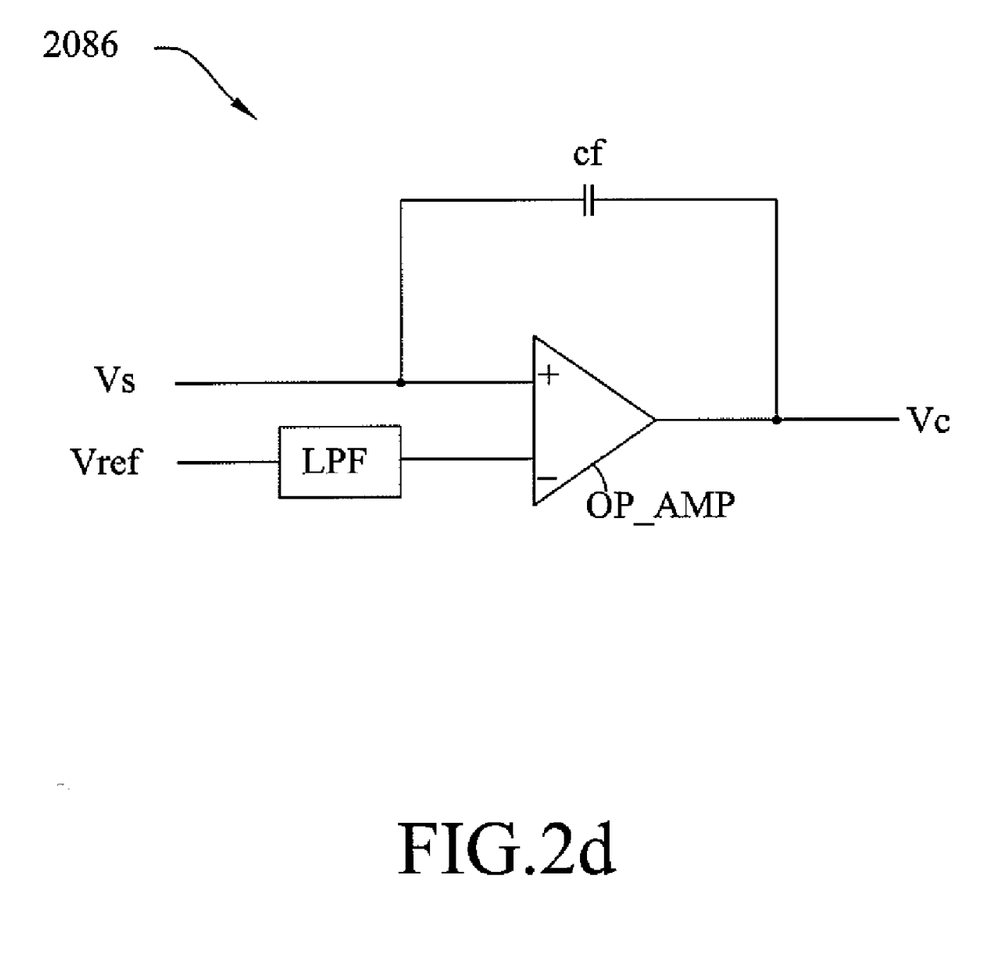
FIG. 2d shows the comparison circuit according to an embodiment of the present invention

As shown in FIG. 2d, the comparison circuit 2086 includes an OP amplifier OP_AMP and an integral capacitor Cf to compare the voltage Vs with the reference voltage Vref. According to the comparison result, the comparison circuit 2086 will output signal Vc to later processing circuits (not shown). The comparison circuit 2086 may include a low pass filter LPF to filter out the noise in the reference voltage which may be formed during the transmission. When the voltage Vs is lower than the reference voltage Vref, the comparison circuit 2086 outputs signal Vc to indicate the capacitance change of the capacitor module 2022, which represent user's touch on the capacitor module 2022. Notably, as mentioned before, in response to different scanning operations, the sampling capacitor Cs could be provided to store electricity flowed out from a single capacitor module 2022 or multiple capacitor modules 2022 and accordingly will have different voltages Vs formed at the sampling capacitor Cs. Different sampling capacitors Cc, comparison circuits 2086, and reference voltages Vref could be selected, depending on the storage of electricity from "a single capacitor module" or from "multiple capacitor modules" corresponding to the number of the capacitor modules 2022.

Figure 2E:
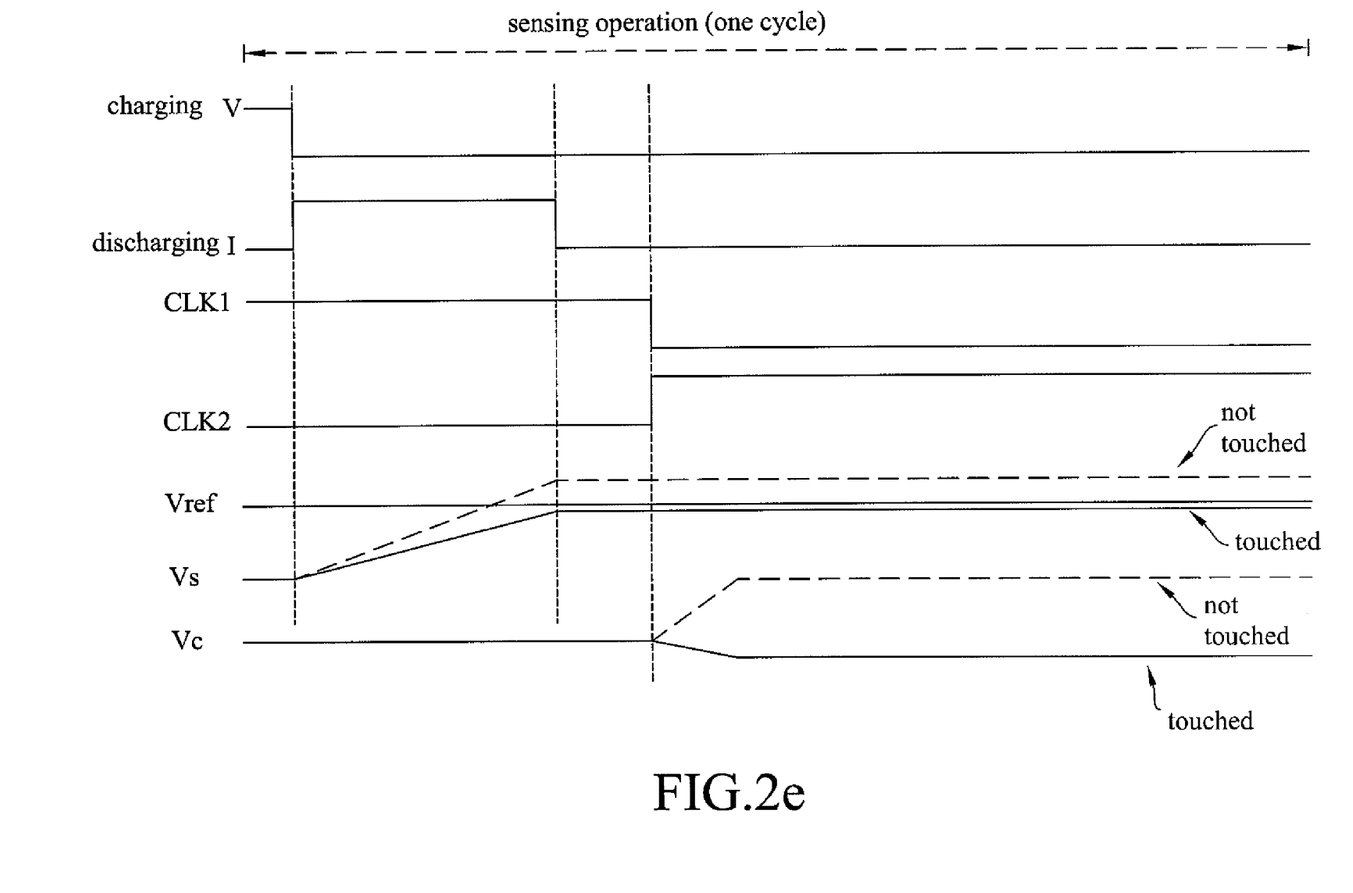
FIG. 2e is a timing diagram of the operation of the touch panel according to an embodiment of the present invention.

FIG. 2e is a timing diagram of the operation of the touch panel according to an embodiment of the present invention. In the following the present invention will be further explained in light of FIGS. 2a, 2c, and 2e. First, the charge/discharge circuit 2082 provides charging voltage V to charge the capacitor module 2022, and then the circuit 2082 discharges the capacitor module 2022 and forms the equivalent voltage VA at node A. In this charge/discharge period, the first timing signal CLK1 turns ON the first set of switches SW1 and SW1', and the second timing signal CLK2 turns OFF the second set of switches SW2 and SW2', so as to charge the sampling capacitor Cc with the equivalent voltage VA to form the sampling voltage Vs. After the discharge of the capacitor module 2022 and the charge of the sampling capacitor Cc, the first timing signal CLK1 turns OFF the first set of switches SW1 and SW1', and the second timing signal CLK2 turns ON the second set of switches SW2 and SW2', so as to make the comparison circuit 2086 receive the sampling voltage Vs and compare it to the reference voltage Vref. Then the circuit 2086 will output signal Vc according to the comparison result of the sampling voltage Vs and the reference voltage Vref. As mentioned above, if the object does not touch the touch panel 200, the capacitor module 2022 has a parasitic capacitor Cp; in contrast, when the object touches the touch panel 200, the capacitor module has the parasitic capacitor Cp and the sensing capacitor Cs connected to each other in parallel, which increase the entire capacitance (as shown in FIG. 2b). In an embodiment, the charge/discharge circuit 2086 provides a fixed current with a fixed discharge period, so the electricity flowed out from the capacitor module 2022 is fixed too. Therefore if the capacitance of the capacitor module 2022 increases, the sampling voltage Vs will decrease, as shown in FIG. 2e. When the sampling voltage is lower than the reference voltage Vref, the comparison circuit 2086 will output a "low" voltage as the signal Vc. In contrast, if the capacitor module 2022 is not touched by the user, its capacitance will not be changed and the sampling voltage Vs will not decrease. When the sampling voltage Vs is higher than the reference voltage Vref, the comparison circuit 2086 will output a "high" voltage as the signal Vc. The later processing circuits (not shown) can decide whether to generate an input signal according to the voltage of the signal Vc, which represents if there is actually a touch by the user.

The embodiments above are explained using a single capacitor module 2022. But the idea could be applied to multiple capacitor modules 2022 in a capacitor group 202. If multiple capacitor modules 2022 in a group 202 are discharged together at the same time, the first set of switches SW1 and SW1' and the second set of switches SW2 and SW2' could be operated in the same manner as mentioned above. But it may require different sampling capacitor Cc and different reference voltage Vref. If multiple capacitor modules 2022 in a group 202 are discharged in turn, the first set of switches SW1 and SW1', the second set of switches SW2 and SW2', and the comparison circuit 2086 are operated in turn for each capacitor modules 2022. Other details could be envisaged by those skilled in the art and thus omitted hereinafter.

With the arrangement mentioned above, the embodiments of the present invention provide a capacitive touch panel which could be integrated into a display device. The capacitive touch panel has some advantages over a resistance touch panel such as not increasing the thickness of the device. Meanwhile, the problems resulted from the parasitic capacitors and noises are addressed. Moreover, the present invention could be applied to sensing by a single capacitor module or by multiple capacitor modules, in turn or simultaneously.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

I claim:

1. An image display system comprising a display device, said display device comprising a capacitive touch panel and a power supply, said display device having a common electrode, said touch panel comprising:
   a sensing capacitor, wherein a capacitance of said sensing capacitor is variable and there is a parasitic capacitance between said common electrode and an electrode of said sensing capacitor; and
   a sampling capacitor, adapted to be electrically connected to said sensing capacitor and said common electrode.

2. The image display system according to claim 1, wherein said touch panel further comprises a comparison circuit selectively connected to said sampling capacitor, wherein when said sampling capacitor is not electrically connected to said sensing capacitor and said common electrode, said comparison circuit compares a voltage of said sampling capacitor with a reference voltage, so as to generate an output signal.

3. The image display system according to claim 1, wherein said touch panel further comprises:
   a first set of switches, disposed between said sampling capacitor and said sensing capacitor and between said sampling capacitor and said common electrode; and
   a second set of switches, disposed between said sampling capacitor and said comparison circuit and between said sampling capacitor and a ground, wherein said second set of switches are operated inversely to said first set of switches.

4. The image display system according to claim 3, wherein said first set of switches are ON/OFF in response to a first timing signal; and said second set of switches are ON/OFF in response to a second timing signal.

5. The image display system according to claim 1, wherein said touch panel further comprises a charge/discharge circuit to charge/discharge said sensing capacitor;
   wherein when said sensing capacitor is discharged, said sampling capacitor is electrically connected to said sensing capacitor and said common electrode.

6. The image display system according to claim 1, further comprises an electronic device, wherein said electronic device is a TV, a mobile phone, a digital camera, a personal digital assistant (PDA), a notebook computer, a desktop computer, a television, a global positioning system (GPS), a car media player, an avionics display, a digital photo frame, or a portable video player.

7. An image display system comprising a display device, said display device comprising a capacitive touch panel and a power supply, said display device having a common electrode, said touch panel comprising:

a capacitor group, comprising:
  a first sensing capacitor, wherein a capacitance of said first sensing capacitor is variable; and
  a second sensing capacitor, wherein a capacitance of said second sensing capacitor is variable and there is a parasitic capacitance between said common electrode and an electrode of said first sensing capacitor or between said common electrode and an electrode of said second sensing capacitor; and
  a sampling capacitor, adapted to be electrically connected to said capacitor group and said common electrode.

8. The image display system according to claim 7, wherein when said sampling capacitor is electrically connected to said capacitor group and said common electrode, said sampling capacitor is electrically connected to said first sensing capacitor and to said second sensing capacitor in turn.

9. The image display system according to claim 7, wherein when said sampling capacitor is electrically connected to said capacitor group and said common electrode, said sampling capacitor is electrically connected to said first sensing capacitor and to said second sensing capacitor at the same time.

10. The image display system according to claim 7, wherein said touch panel further comprises a comparison circuit selectively connected to said sampling capacitor, wherein when said sampling capacitor is not electrically connected to said first sensing capacitor and said second sensing capacitor of said capacitor group and said common electrode, said comparison circuit compares a voltage of said sampling capacitor with a reference voltage, so as to generate an output signal.

11. The image display system according to claim 7, wherein said touch panel further comprises:
  a first set of switches, disposed between said sampling capacitor and said capacitor group and between said sampling capacitor and said common electrode; and
  a second set of switches, disposed between said sampling capacitor and said comparison circuit and between said sampling capacitor and a ground, wherein said second set of switches are operated inversely to said first set of switches.

12. The image display system according to claim 11, wherein said first set of switches are ON/OFF in response to a first timing signal; and said second set of switches are ON/OFF in response to a second timing signal.

13. The image display system according to claim 7, wherein said touch panel further comprises a charge/discharge circuit to charge/discharge said capacitor group;
  wherein when said first sensing capacitor and/or said second sensing capacitor are discharged, said sampling capacitor is electrically connected to said discharged first sensing capacitor and/or said second sensing capacitor and said common electrode.

14. A method for controlling a capacitive touch panel incorporated in a display device, said display device having a common electrode, said capacitive touch panel comprising a sensing capacitor and a sampling capacitor wherein a capacitance of said sensing capacitor is variable and there is a parasitic capacitance between said common electrode and an electrode of said sensing capacitor, said method comprising:
  (a) charging said sensing capacitor module;
  (b) discharging said sensing capacitor; and
  (c) in response to said sensing capacitor being discharged, electrically connecting said sampling capacitor to said sensing capacitor and said common electrode.

15. The method of claim 14, further comprising:
  (d) after said sensing capacitor is discharged, electrically isolating said sampling capacitor from said sensing capacitor and said common electrode; and
  (e) comparing a voltage of said sampling capacitor with a reference voltage, so as to generate an output signal.

16. The method of claim 15, wherein said touch panel further comprises a first set of switches and a second set of switches, said first set of switches being disposed between said sampling capacitor and said sensing capacitor and between said sampling capacitor and said common electrode, said second set of switches being disposed between said sampling capacitor and said comparison circuit and between said sampling capacitor and a ground;
  wherein step (c) further comprises: turning ON said first set of switches by a first timing signal and turning OFF said second set of switches by a second timing signal, wherein said first timing signal and said second timing signal are inverse to each other; and
  wherein step (d) further comprises: turning OFF said first set of switches by said first timing signal and turning ON said second set of switches by said second timing signal.

17. The method of claim 14, said touch panel comprising a capacitor group, said capacitor group comprising a plurality of said sensing capacitors;
  wherein the step (a) comprises: charging said capacitor group;
  wherein the step (b) comprises: discharging any one sensing capacitor of said capacitor group;
  wherein the step (c) further comprises: in response to said any one sensing capacitor being discharged, electrically connecting said sampling capacitor to said any one sensing capacitor and said common electrode.

18. The method of claim 17, wherein the step (b) further comprises:
  discharging said plurality of sensing capacitors of said capacitor group in turn.

19. The method of claim 17, wherein the step (b) further comprises:
  discharging said plurality of sensing capacitors of said capacitor group at the same time.

20. The method of claim 19, further comprising:
  (d) after said plurality of sensing capacitors are discharged, electrically isolating said sampling capacitor from said plurality of sensing capacitors and said common electrode; and
  (e) comparing a voltage of said sampling capacitor with a reference voltage, so as to generate an output signal.

* * * * *